(12) United States Patent
Nemeth

(10) Patent No.: US 7,382,690 B2
(45) Date of Patent: Jun. 3, 2008

(54) METHOD AND APPARATUS FOR GATHERING SEISMIC DATA

(76) Inventor: Geza Nemeth, 5903 Round Table Cove, Austin, TX (US) 78746

( * ) Notice: Subject to any disclaimer, the term of this patent is extended or adjusted under 35 U.S.C. 154(b) by 0 days.

(21) Appl. No.: 11/451,274

(22) Filed: Jun. 12, 2006

(65) Prior Publication Data

US 2006/0233051 A1    Oct. 19, 2006

Related U.S. Application Data

(63) Continuation of application No. 10/017,961, filed on Dec. 7, 2001, now Pat. No. 7,085,196.

(51) Int. Cl.
*G01V 1/16* (2006.01)
(52) U.S. Cl. ................. 367/178; 367/76; 367/188; 181/122
(58) Field of Classification Search ............. 367/13, 367/14, 76, 178, 188; 181/122
See application file for complete search history.

(56) References Cited

U.S. PATENT DOCUMENTS

| | | | |
|---|---|---|---|
| 4,152,691 A | 5/1979 | Ward | |
| 4,320,472 A | 3/1982 | Fort | |
| 5,189,642 A | 2/1993 | Donoho et al. | |
| 5,379,025 A | 1/1995 | Tatom et al. | |
| 5,469,403 A | 11/1995 | Young et al. | |
| 6,353,577 B1 | 3/2002 | Orban et al. | |
| 6,671,222 B2 | 12/2003 | Wilson et al. | |
| 6,977,867 B2 * | 12/2005 | Chamberlain | 367/76 |
| 2002/0169559 A1 | 11/2002 | Onyia et al. | |

FOREIGN PATENT DOCUMENTS

WO    WO 98/12577    3/1998

OTHER PUBLICATIONS

PCT International Search Report, mailed May 5, 2003, European Patent Office, 8 pages.

* cited by examiner

*Primary Examiner*—Ian J Lobo
(74) *Attorney, Agent, or Firm*—Robert C. Kowert; Meyertons, Hood, Kivlin, Kowert & Goetzel, P.C.

(57) ABSTRACT

In the present invention, a seismic receiver contains an onboard digitizer that samples and converts a signal from detected seismic energy into the digital domain. The receiver contains an analog to digital converter, a transmission circuitry, and a link to the seismic detection circuitry. The signal from the seismic detection circuitry is converted into a digital signal, which is then relayed to the data recorder. These components are all resident to the receiver itself. Additional control circuitry is employed to provide clocking and testing functions. These receivers communicate with one another, and provide sampled seismic data on an individual basis. The components may be prepared on a PCB and put inside the receiver cap. The PCB may be flexible in nature, as to provide a maximum of surface mounted components in the smallest amount of space.

13 Claims, 8 Drawing Sheets

METHOD AND APPARATUS FOR GATHERING SEISMIC DATA

PRIORITY DATA

This application is a continuation of U.S. patent application Ser. No. 10/017,961 filed on Dec. 7, 2001, now U.S. Pat. No. 7,085,196 with Geza Nemeth listed as inventor.

BACKGROUND

1. Field of the Invention

The present invention generally relates to a system and method for gathering seismic data. In particular, the present invention relates to a system and method for enhancing the collection and ease of such data and determining various conditions associated with such seismic receivers.

2. Description of Prior Art

In the typical prior art, seismic exploration employs an energy source to impart energy into an object, such as the ground. The various energies strike various formations and are reflected or refracted.

Receivers are employed in a pattern to pick up the returning waves. These receivers pick up the returning wave and convert the received energy into another signal that may be transmitted to a collection station. In typical operation, the receivers convert the received energies into an analog electric signal.

In typical operation, the receivers (or "phones") are strung together in streamers. The signals are thus transmitted in an additive fashion, and the collection device only receives the "summation" signal of a group of streamers. The collection device may then digitize this stream and either store it or retransmit the data corresponding to the signal. In this manner, when a single receiver fails, detection and amelioration of the problem is hampered, since an operator cannot discern easily which phone has been compromised, let alone which component of the phone has failed or falls outside of operating tolerances. In this case, each phone must be individually tested until the culprit is found. This adds time and expense to many seismic surveys.

Thus, antenna effect problems of each phone, ground roll, direct line energy from the source, or other combinations of signal degradation may hamper the viability of numerous readings. If one phone is not working in specification, then the data from the entire streamer may also be compromised.

Additional problems are introduced when the phones are placed on a varying plane. In this case, the seismic breaks contain an additional offset not related to their distance apart in an x-y plane. When the arriving seismic energy comes to each detector, the breaks appear as a function of the distance the seismic receptor is from the source, as well as the geometry and properties of the reflective and refractive subsurface features. In the typical streamer, an offset may be used to compensate for this time lag due to these features.

In many typical systems, however, the streamers are not aligned on perfectly flat surfaces. In this case, the offsets will vary as the height of the point where the phone is relative to that of its kindred on the streamer. As such, a different static must be used to offset the height difference of the individual phones, and a potentially different static correction must be made for every phone that "adds" its signal to the overall trace. In this manner, the collection of the seismic data from an aggregation of phones suffers from inaccuracies introduced in the process, and which cannot be easily backed out.

Additionally, new add-on modules to the phones add complexity to the set up of the seismic survey. Many typical crewmembers, or doodlebuggers, lack skilled training to add units to a streamer. Many doodlebuggers are not easily retrained on new equipment. As such, the introduction of "add-on" modules to the seismic receptors is not easily or effectively accomplished in all cases.

Additionally, such modules need to be stored when not in use, packed up for new surveys, and re-laid for each new array geometry. Thus, the additional modular units add to the time necessary to prepare, conduct, and dissemble for each survey. Further, the additional modular connections increase the chances for potential failures, as well as increase the cost of the overall instrumentation needed for the performance of the survey.

As such, many typical seismic detection systems suffer from deficiencies in providing accurate indications of defects. Many other problems and disadvantages of the prior art will become apparent to one skilled in the art after comparing such prior art with the present invention as described herein.

SUMMARY OF THE INVENTION

Aspects of the invention can be found in a seismic receiver for detecting seismic energy and digital data relating to the detected seismic energy to a data recorder. The receiver has a casing, within which resides a seismic energy detector. The seismic energy detector detects seismic energy and converts the detected seismic energy into an analog electrical signal.

An analog to digital converter is coupled to the seismic energy receptor, and converts the analog electrical signal into the digital data. Digital signal transmission circuitry is coupled to the analog to digital converter, and transmits the digital data to the data recorder.

In one aspect, the digital data is initially transmitted in a serial fashion to an intermediate digital circuitry. From the digital circuitry, such as a microprocessor or controller, the digitized data may be relayed to a high-speed telemetry unit, or directly to the data recorder.

The seismic energy detector, the digital transmission circuitry, and the analog to digital converter are all housed within the casing. In this manner, antenna effects and crossfeeds are substantially reduced, if not eliminated.

In another aspect of the invention the seismic receiver contains control circuitry. The control circuitry is coupled to the analog to digital converter, that controls functions associated with the operation of the seismic receiver. The control circuitry can be a controller or microprocessor, and may be modified in its operation through transmission of new information from an external source. Or, the control circuitry can be discrete components in nature, or be a combination of programmable components and discrete components.

Additionally the control circuitry can provide clocking signals to the analog to digital converter. This clocking may also be selectively controlled from outside the receiver.

The seismic receiver may be operable to receive a signal from an external source. The receiver can initiate a transmission of the digital data in response to the signal.

In one embodiment of the invention, the seismic receiver has an amplifier. The amplifier is coupled to the analog to digital converter and amplifies the analog signal. The control circuitry can selectively set the level of amplification of the analog signal. Additionally, the control circuitry can drive the inputs of the amplifier to test the circuit package. In one aspect of the invention this non-production testing may detect a difference in the orientation of the seismic receiver from the horizontal.

In another aspect of the invention, a power management circuitry is located in the receiver. The power management circuitry is housed in the casing and provides power to components of the seismic receiver.

Many of the above described components can be implemented on a printed circuit board (PCB) contained within the receiver, which are commonly used to provide mounting and connection capabilities for electrical devices. The digital transmission circuitry, the control circuitry, and the analog to digital converter can all be embodied on a PCB contained in the casing.

Other aspects of the invention are drawn to a method for obtaining seismic data. The method contains the steps of detecting a seismic event at a seismic receiver, converting the seismic event into an analog electrical signal, converting the analog electrical signal into digital data. These functions all take place within the casing of a seismic receiver.

The step of converting the analog signal may be accomplished with an analog to digital converter. Many of the aforementioned steps may be aided with control circuitry.

Further steps include awaiting a signal to transfer the digital data. The digital data is transferred to a remote collection device upon receiving the signal to transfer. In one case, the signal to transfer is generated from outside of the receiver. Or, the signal to transfer can be generated from within the receiver.

As before, the incoming analog electrical signal may be amplified. Again, this can be accomplished with the control circuitry.

Other aspects of the invention may be found in a method of collecting seismic data from a seismic receiver at a collection device, where the seismic receiver monitors seismic energy. Steps in this method include determining a digital signal indicative of the seismic energy detected by the receiver, and transmitting the digital signal to the collection device.

In one embodiment, the receiver may store collected data in a memory. Or, the data may be sampled and sent immediately.

Again, the step of transmitting may be performed in response to a signal from the collection device. Or it may be performed in response to a signal from another receiver.

Other aspects of the invention are found in an apparatus to digitize a seismic signal collected by a seismic signal collector of a seismic receiver, where the seismic receiver has a casing. The apparatus contains a board capable of conducting electrical signals, such as a PCB. A digitizer is communicatively coupled to the seismic signal collector and contained on the board. The digitizer digitizes the seismic signal. The apparatus fits inside the seismic receiver.

Again, the apparatus may also have a control circuitry. The control circuitry is coupled to the digitizer and can control the digitizing of the seismic signal.

In another embodiment, the board can be folded on itself without breaking the electrical connections contained thereon. One method of accomplishing this is to use flex-rigid PCB's. In this manner, the board may be easily contained in typical seismic receivers, as well as eliminate many problems associated with mechanical interconnections.

Other aspects of the invention are found in a streamer that contains many receivers interlinked with one another. Additional aspects of the invention are found in seismic collection system having a data recorder coupled to the receivers.

Other aspects, advantages and novel features of the present invention will become apparent from the detailed description of the invention when considered in conjunction with the accompanying drawings.

DETAILED DESCRIPTION

Figure 1:
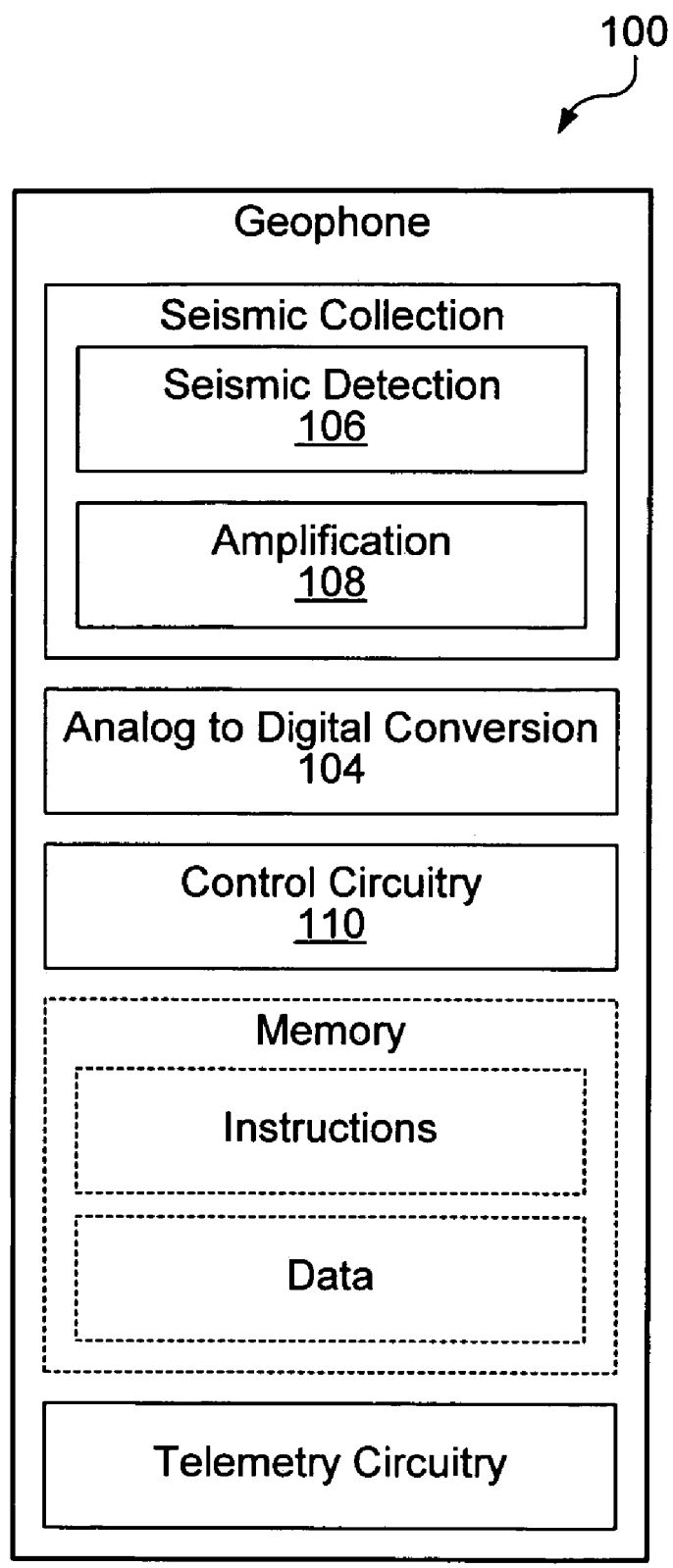
FIG. 1 is a schematic view of a seismic receiver according to the invention.

FIG. 1 is a schematic view of a seismic receiver according to the invention. The seismic collection phone 100 contains a seismic collector system and an analog to digital converter 104. The seismic collector system and the analog to digital converter 104 may be housed in the same housing, or may exist across an interconnect to different housings.

The seismic collector system operates as a typical geophone. The incoming seismic signals are detected at a seismic detection circuitry 106, and may be amplified through an amplification circuitry 108. In a typical prior art system, the outgoing signal at this point would leave the housing and would be transmitted to a seismic collection system. In practice, this outgoing signal is typically wire tied to other geophone outputs, and a summed signal of all the coupled geophones would be ultimately transmitted to the collection device.

In the present system, the amplified seismic signal is transmitted to an onboard analog to digital converter 104. The analog seismic signal, or trace, is transmitted to the analog to digital converter 104, where it is converted to a digital representation of the signal.

The digital representation of the signal can then be transmitted to a digital portion of the smart geophone. The digital representation of the signal is then transmitted to the upstream collection device. As such, the received seismic signal is not transmitted to the collection device in the additive fashion. The digitized signal may be presented to the digital portion of the smart geophone as a serial stream of information. Based on the serial stream of information, the digital portion of the smart geophone can perform many functions or initiate many tasks.

Many of the functions described in relation to the smart geophone may be realized through a control circuitry 110. This may be a controller, a microprocessor, or any other form of circuitry that controls the geophone as described below. The circuitries may be coupled to attached memory that contains data or instructions that control their operation. This memory may take many forms, such as flash memory, EPROM, or read/write memory such as SRAM, DRAM, or SDRAM.

Typically, the digitized information is read and telemetered upstream through a digital data controller, such as a UART or USART. Or, in another embodiment, the information may be cached local to the smart geophone and relayed in a "bundle", rather than in serial sequence as it is sampled and digitized.

The data may be telemetered in many ways. It may be sent out through a wired network connection, wireless network connection, or any other data connection that allows the transfer of digital data.

The digital portion of the smart phone may also contain testing features. In one embodiment, the controller or processor circuitry generates test signals that are fed into the analog front end, or at any point in the data stream path.

In this manner, the phone may test itself for compliance and operability. As such, analog streams cannot easily be diagnosed in such a manner, nor may they easily be tested remotely.

In one embodiment of the testing, the control circuitry generates test signals to the system. In typical seismic setups, the seismic collection circuitry has moving parts. These moving parts detect the seismic waves, and in turn, generate an analog electrical signal. In converse mode, when an electrical signal is applied to the system, this will generate movement in the seismic detection circuitry. This movement affects the analog signal. Thus, when the freedom of movement of the components is changed, the test signal will produce different signals at the amplifier.

Typically, in normal operation, the seismic collection circuitry is responsive to movements in a generally perpendicular direction with respect to the circuitry. Thus, when the phone is in an upright position, the force of gravity counteracts the movement of the collection circuitry components. This, in turn, results in a certain test signal presented at the front end.

As the phone is laid more generally on its side, the components in the seismic detection circuitry are able to move about more easily. This is since the gravity dampens the movement of the components to a lesser amount in this orientation relative to the upright. This results in a different signal present when the components are perpendicular to the horizontal. Thus, the induced motion of the collector in different orientations will produce different responses in a test signal. In this manner, the orientation of the phone relative to the perpendicular may be measured by the test signal.

For example, when a test signal is initiated in the seismic phone when the phone is in a generally upright position, the moving parts of the detection circuitry are dampened by the force of gravity. To the observer of the induced response, the response appears to be a normal response of the phone.

However, assume that the phone is in a position where the detection mechanisms are generally horizontal to the force of gravity. The force of gravity in this orientation does not dampen the action of the mechanism due to the induced signal.

As the phone is rotated from the generally horizontal orientation to the generally vertical orientation, the same test signal will produce different responses. In fact, varying degrees of signal change, both in amplitude and characteristic can be observed on the phone as the test signal is introduced to the phone as it is rotated. Based on the return from the test signal, an operator, can determine the angle at which the phone is placed. Or, the signals can be automatically assessed by electronic means at the receipt of such signal.

Based on the determination of angle attack for the phone, differing compensations can be applied to each phone based on its angle to the ground. In this manner, the phone can be self-detecting to determine either improper placement relative to the ground, or a compensation can be applied.

More specifically, when testing the phone, the phone dampening resistor is turned off, the coil is driven or lifted to its end position and released. When the phone is in upright position, the direction of the coil movement is the same as the gravity. As such, the phone natural response curve is the induced response signal.

When the phone is on its side, the direction of the coil movement is perpendicular to the force of gravity. The induced response signal has different characteristic and amplitude. In this case, when the phone is generally more on its side, the induced response signal is dramatically reduced in amplitude, and the characteristic response is also drastically different.

In one embodiment, the controller circuitry changes the parameters of the collection. The signals from the controller or processor may be used to drive switches that change the method of collection. For example, the controller or processor can initiate the powering of a transistor, which opens an alternative resistive path for the initial amplifiers on the front-end data collection. In this manner, the controller or processor may be used to change the initial amplification of the received seismic signal.

In another embodiment, the controller or processor may be used to generate internal clocking signals. In this manner, the clock signal that latches the analog data, and the clock signals that time the transfer of any data to the digital portion of the phone may be generated by the phone.

In another embodiment, power is supplied directly to the phone through an external connection. As such, the phone relies on the outside power source for the energy to power the smart phone functionality. Additionally, the outside connection can be used as the telemetry link to the external data connection.

Figure 2A:
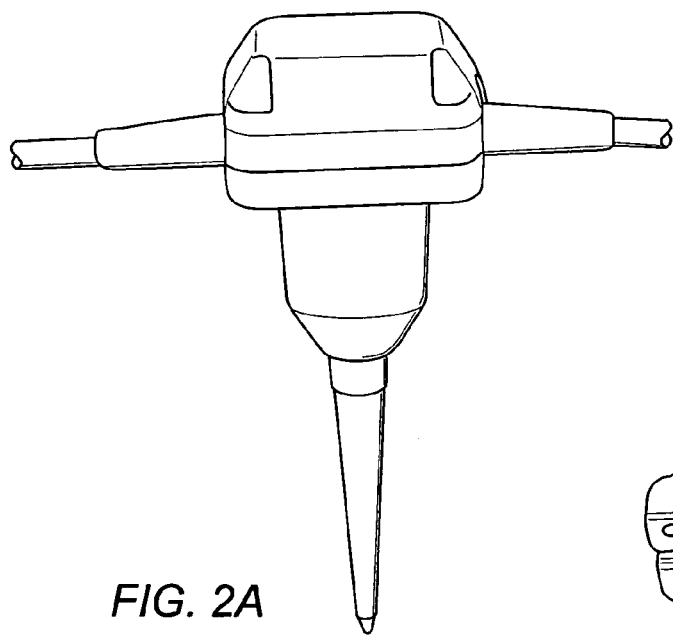
FIGS. 2a and 2b are side views of an embodiment of the invention of FIG. 1.
Figure 2B:
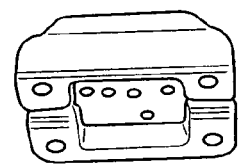
Figure 2B:
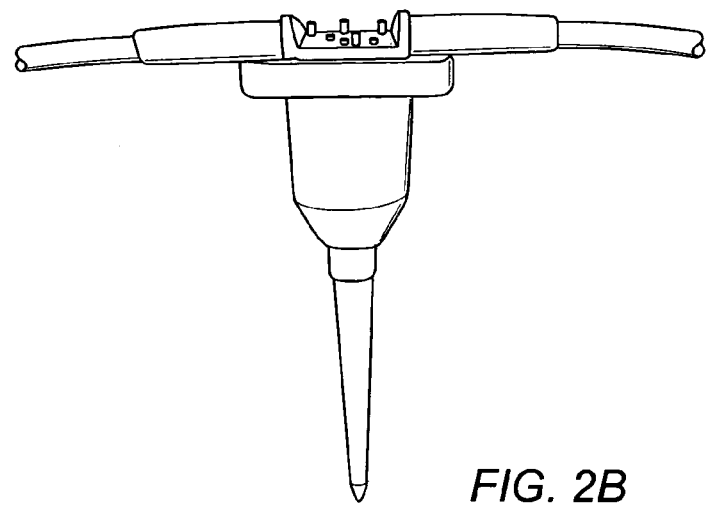

FIGS. 2a and 2b are side views of an embodiment of the invention of FIG. 1. As can be seen, the receiver looks like a typical geophone receiver, and has the same couplings. The phone has a cover that can be removed, and in an embodiment, the inside portion of the cover is hollowed out. In the cover a PCB containing the components of the geophone as described above may be placed.

In the main body of the geophone, the phone may be no different than that existing in the prior art. However, the normal output of the phone is not coupled to the lines emanating from the sides of the body, but into the PCBs contained in the top section of the of the cover. In this manner, the normal received signals are routed to the components described above in relation to FIG. 1. Thus, a typical existing geophone may be retrofitted or converted for use as the present invention.

Also, without additional training, crews can handle the geophone in the same manner as typical geophones. The existing connections between the single phones and the outside world remain the same. In one embodiment, the lines couple a series of phones together to form a streamer. In this case, no additional components need to be added externally to each geophone, thus maintaining a constant appearance and method of operation to the crews involved.

Figure 3:
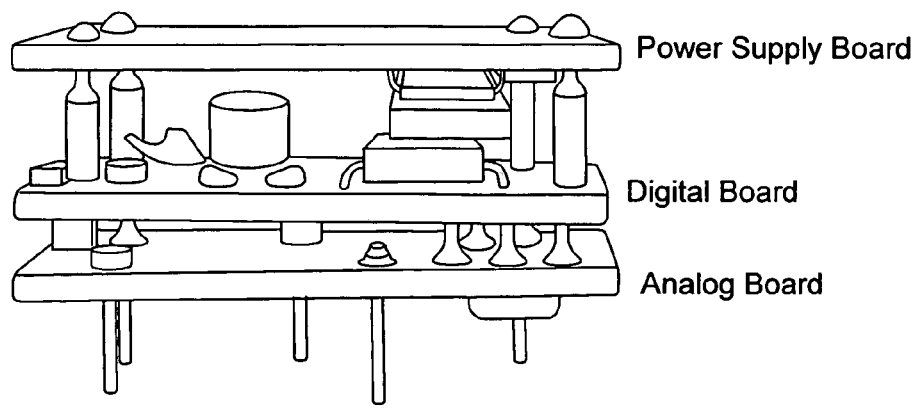
FIG. 3 is a side view of one embodiment of a PCB that may be used in the phone of FIGS. 2a and 2b.

FIG. 3 is a side view of one embodiment of a PCB that may be used in the phone of FIGS. 2a and 2b. In this manner, the component portions of the geophone assembly described in relation to FIG. 1 may be practiced. In this case, the power supply component is placed on top. A digital component board is placed in the middle, and the analog interface components are placed on the bottom.

Figure 4:
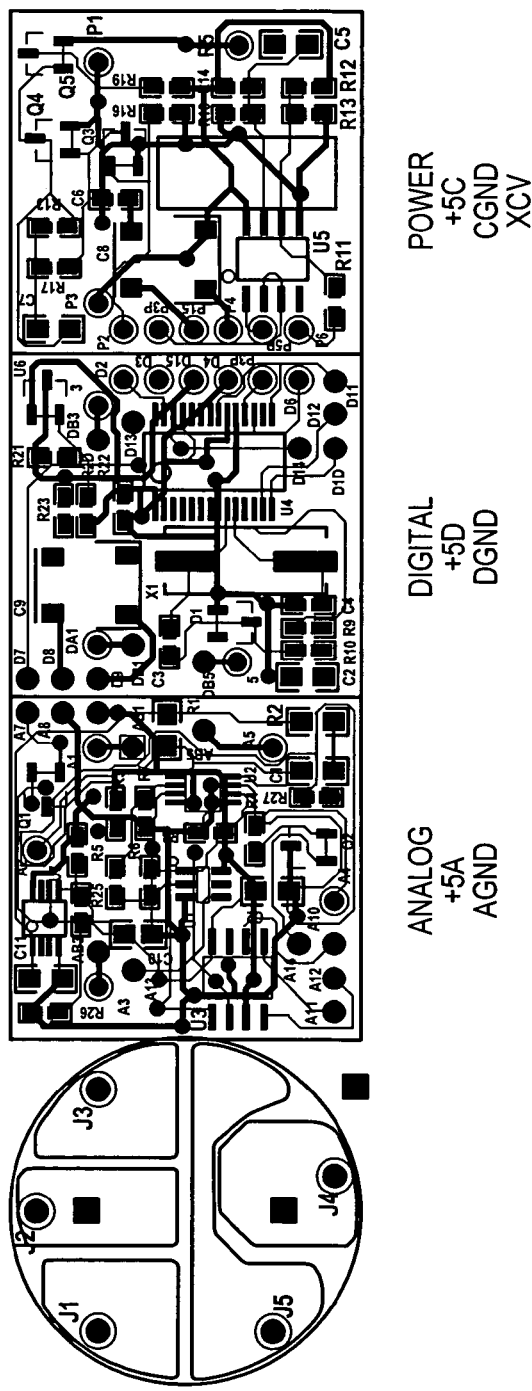
FIG. 4 is a top view of another embodiment of the PCB of FIGS. 2a and 2b.

FIG. 4 is a top view of another embodiment of the PCB of FIGS. 2a and 2b. In this case, the components are functional aspects of the phone described in relation to FIG. 1 and placed on a single PCB. The PCB can have flex joints, allowing the board to be folded over one another. The PCB may be coated with an insulator as a final step, thus insuring no electrical interaction between the components after they are folded over one another.

In this case, the board need not have any vertical interconnects. When the flexible PCB is folded, the horizontal interconnects are transformed into vertically displaced interconnects. As a final step, the entire folded board may be encased in a silicon gel. This allows the unit to be handled in harsh environments without introducing movement in the flex joints.

In one embodiment, the smart phone contains a power section. In this section, the various voltages can be generated. In this manner, the power section can derive and deliver separate voltages and grounds for the internal components of the phone. Again, the operation of the power and initiation of the power circuitry may be enabled through the control circuitry. Again, the initiation of the power management circuitry may be enabled through a signal arriving from an external source. In this manner, receivers may be selectively enabled or disabled from a remote location.

Figure 5:
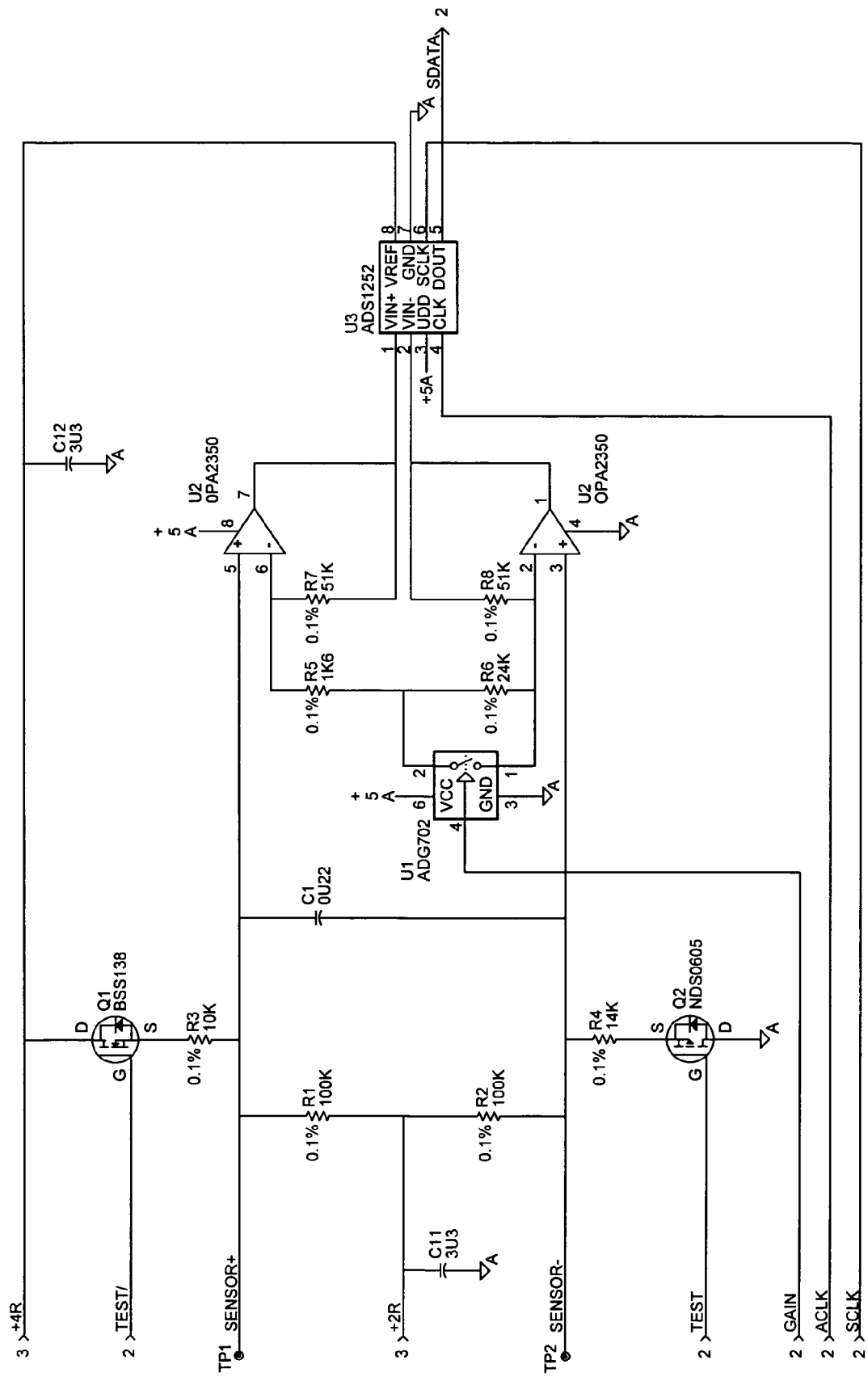
FIG. 5 is a schematic diagram of an embodiment of the analog interface of the phone of FIG. 1.

FIG. 5 is a schematic diagram of an embodiment of the analog interface of the phone of FIG. 1. The sensor inputs from the geophone come in through a signal TP1 and TP2, respectively. These denote the positive and negative nodes of the typical geophone setup. These signal are routed to a set of amplifiers, and then to a digital to analog converter. Thus, the signal from the typical geophone is amplified and then converted into a digital signal.

The gain of the amplification may be set by the GAIN signal. When the GAIN is asserted, a different resistive path is defined for the negative inputs of the amplifiers. In this case, the gain control can be selected from an external signal.

The analog to digital converter is clocked by the ACLK signal, also generated from an external source. Upon the ACLK signal, the analog signal is latched by the analog to digital converter (AD converter). The output of the Analog to digital converter is latched out through the SCLK signal. In this manner, the value of the seismic signal is digitized and prepared to transmission elsewhere in the system.

Test lines enable the testing of the system. When signal appear on these lines, the analog to digital conversion may be tested, or signals may be tested for problems in the particular seismic sensing circuits. These lines may be controlled and operated by control circuitry, described elsewhere. These lines also allow the measurement of the phone relative to the perpendicular.

Figure 6:
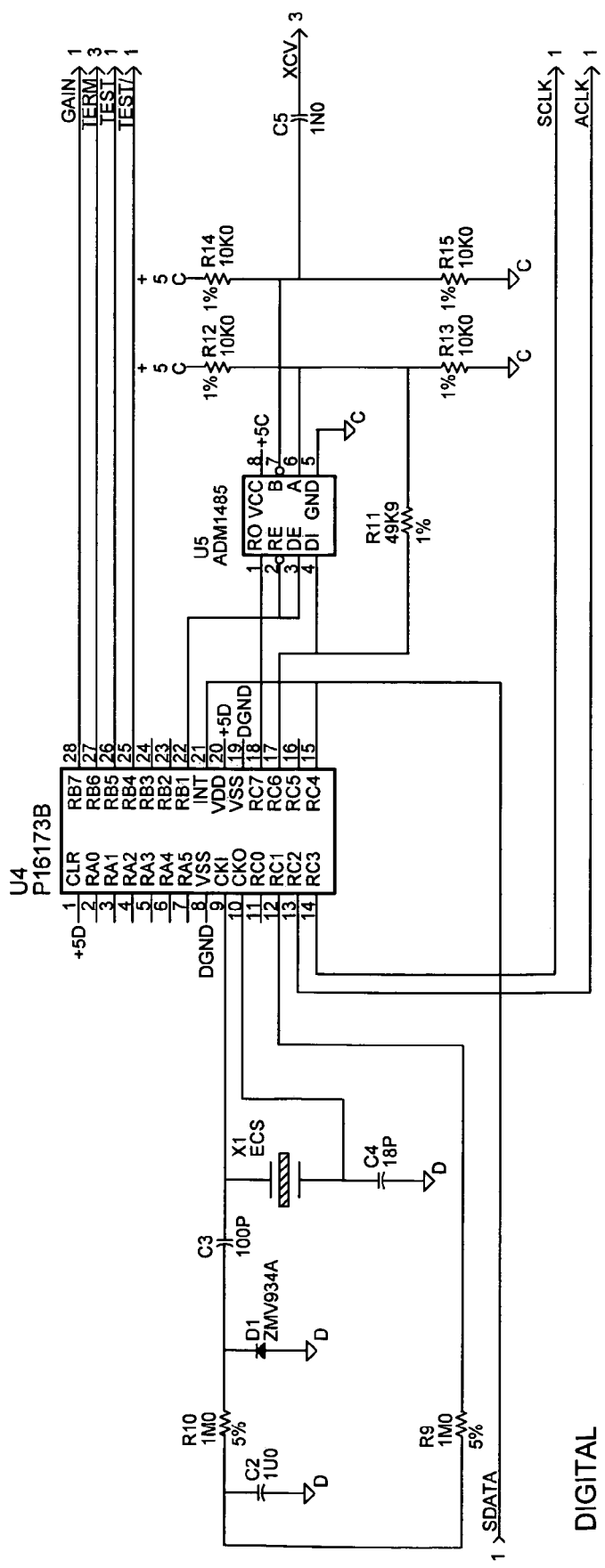
FIG. 6 is a schematic diagram of an exemplary embodiment of a digital portion of the phone of FIG. 1.

FIG. 6 is a schematic diagram of an exemplary embodiment of a digital portion of the phone of FIG. 1. In this embodiment, the data from the analog to digital converter of FIG. 5 is transmitted to the controller or processor U4. In this embodiment, the controller or processor U4 clocks a serial exchange of data between the analog to digital converter and itself. Another output device U5 is coupled to the processor, and links the smart geophone components to the external environment. In this embodiment, the processor is coupled to a flash memory. The flash memory contains instructions that enable the processor to retrieve the data from the analog to digital converter, to generate the various signals for setting gain, test signals, and the clocking signals.

At an appropriate time, the processor is instructed by the external data collection device that it should relay any data up to the external data collection device. When this happens, the processor may enable the clocking signals for the analog to digital converter, may retrieve the data from the analog to digital converter, and may transmit the data to the external collection device through the circuitry U5.

It should be noted that many schemes might be employed for data collection and storage. For example, the device may only latch and transmit data when it receives an appropriate interrupt or instruction from the external environment. Or, it could latch and store on an ongoing basis. Or, it could latch and store multiple data points, and submit such data upstream in a "data dump" rather that on an "as warranted" basis.

In one embodiment, the wire coupling between the phone and the external data collector also couples the phone to other phones in a streamer. The phone or streamer of phones may be powered using the same wiring that is employed as the data path between the steamer, phone, and external data collection device.

The control circuitry may also operate the test lines associated with the previous diagram. In this case, the control circuitry receives an indication that the phone is to be tested. The control circuitry may enable and control the testing of the amplification circuitry, or the analog to digital conversion circuitry.

Additionally, the testing features may allow for a test analog signal to be input to the system. Or, a test seismic signal may be generated in the vicinity of the apparatus, or a stream of the phones, or an array of such phones. The test signal may be used to determine which receivers are operating within the tolerances specified on an individual basis. In this manner, individual failures in the phones may be detected.

In this case, the "additive" nature of typical systems is overcome. In the previous typical systems, a failure of an individual phone led to the degradation of an entire data stream for an associated streamer. The problem could not be isolated further.

In the present embodiments, the failure or the operation of a particular geophone operating outside the allowable tolerances is easily detected, and can be detected remotely. Further, it is possible to isolate the particular components of the failure, as well as determining the particular apparatus which has exhibited such failure.

Figure 7:
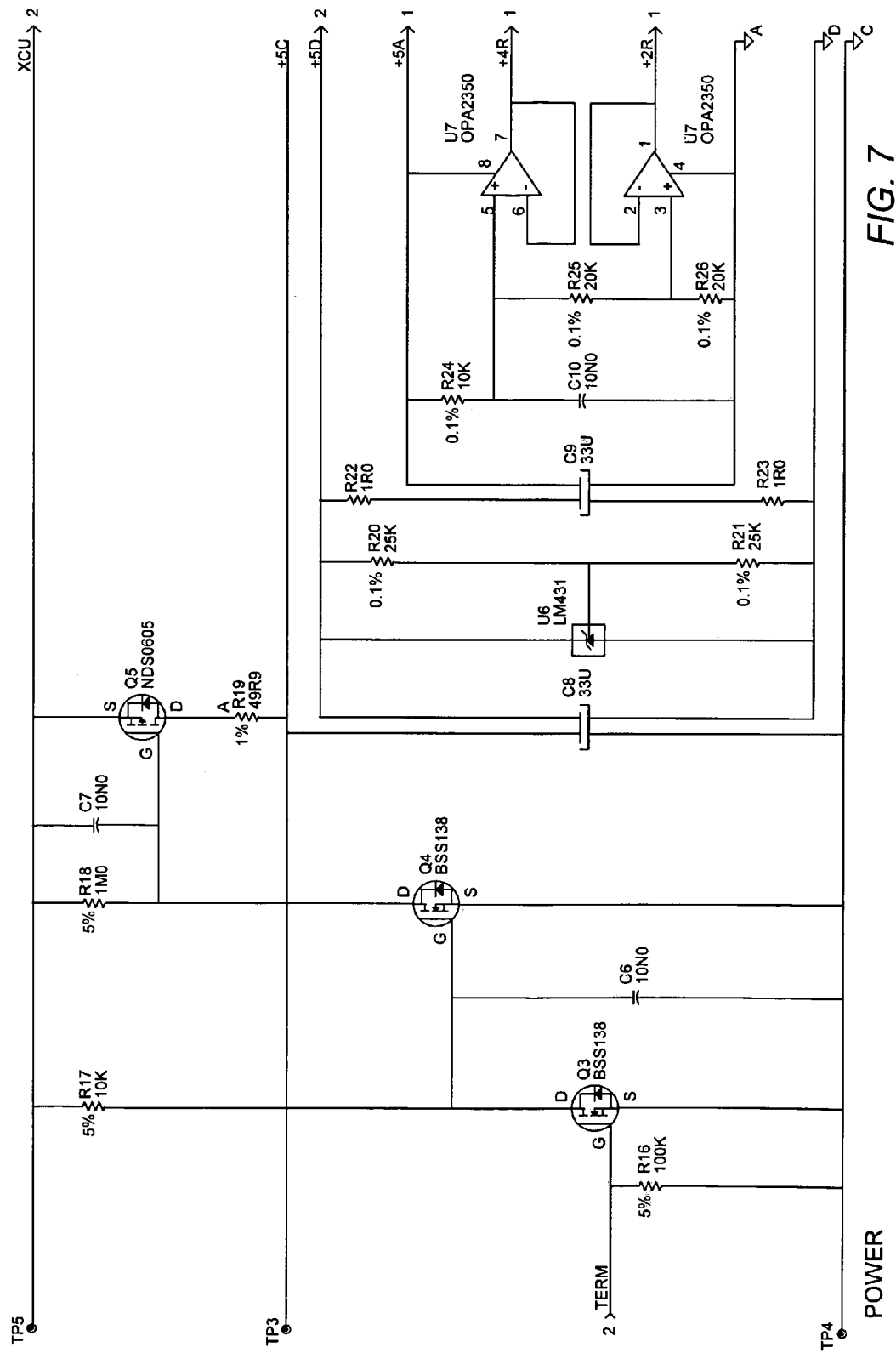
FIG. 7 is a schematic diagram of an exemplary embodiment of a power management system of FIG. 1.

FIG. 7 is a schematic diagram of an exemplary embodiment of a power management system of FIG. 1. The power management system couples to an external power source, such as a current generator. Upon initiation of the phone, the power management circuitry provides the various ground levels and voltages for the operation of the analog circuitry and the digital circuitry described above.

Figure 8:
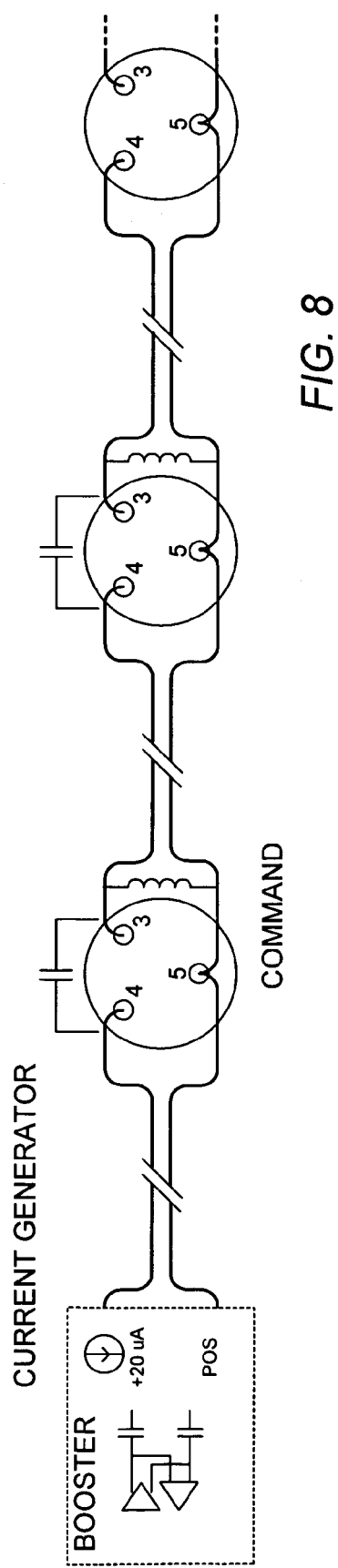
FIG. 8 is a schematic diagram showing multiple phone of the invention coupled to a power source.

FIG. 8 is a schematic diagram showing multiple phones of the invention coupled to a power source. In this diagram, three phones are coupled to one another, and ultimately to a power generator. In this case, the phones are coupled to a current generator. In this embodiment, both command signals and power signals operate on the wires. Thus, the same hookup that connects the powered generator to the phones allows commands to be relayed to the phones, as well as clocking information to synchronize the operation of the phones.

In an exemplary embodiment, an outside control system may direct the retrieval of information from the phones. In one example, the outside control system may generate one retrieval command. This, along with clocking information, would allow a synchronous transmission of information form each of the phones back to the external information collection system. Or, the control system may specify individual phones through the transmission of an identification code that particularly identifies the phone that is to send its information.

Or, the control system could generate a single identification for a streamer. The initial phone would receive the command and transmit its data. Then, the first phone would generate a command to be sent to the second streamer for it to transmit its data. This would continue down the line until the information for the streamer is collected.

As such, many different modes of data collection can be contemplated, as well as many different types of storage schemes. In this manner, the individual data for the geophones is transmitted to the collection device, rather than having the streamer act in an analog summation mode. Further, to the average crewmember, there are no extra components, since the geophone appears to the average crewmember to be a typical geophone. No extra training in wiring or operation is needed, and previous geophones can be retrofitted to take advantage of the fine grain data collection produced.

Figure 9:
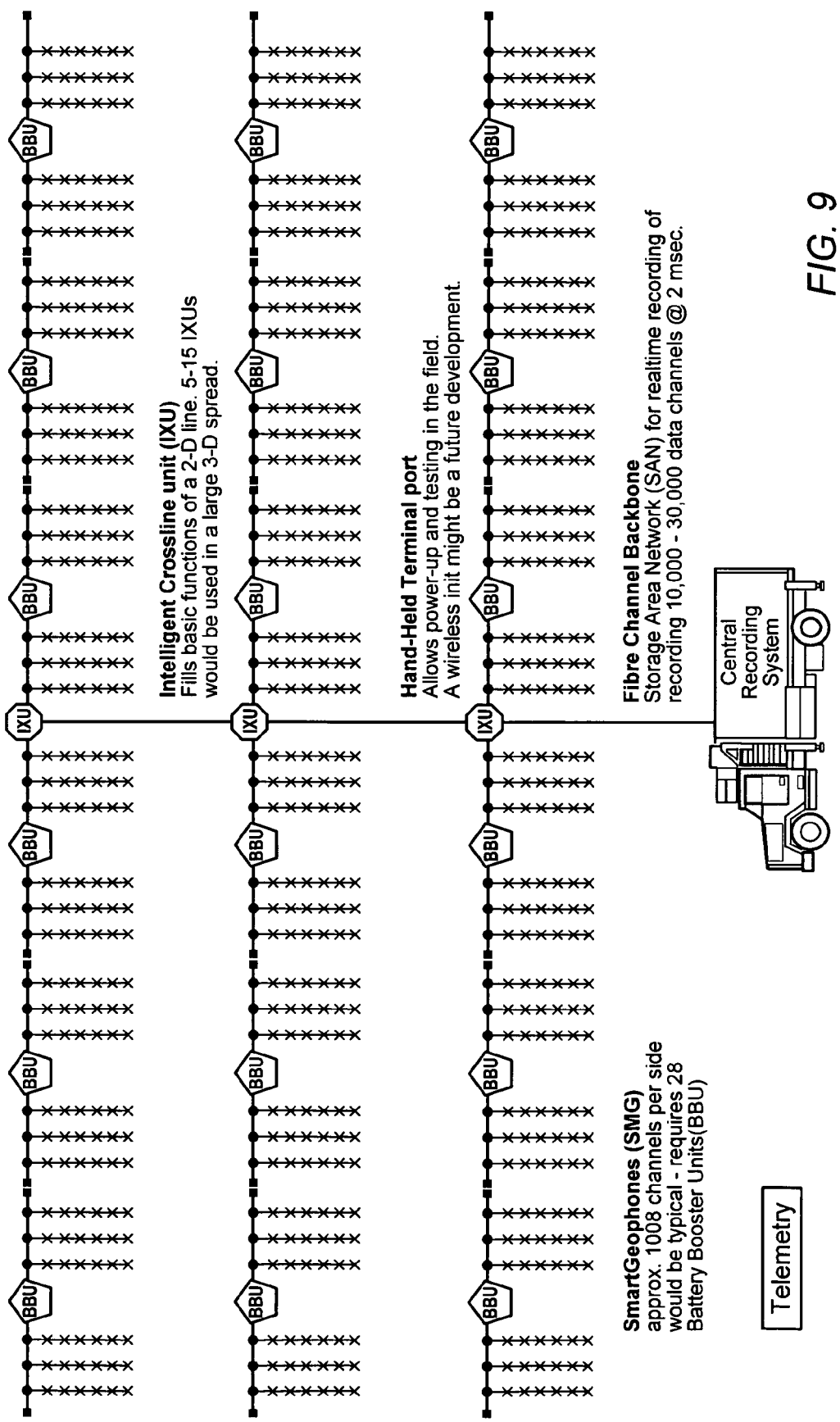
FIG. 9 is a block diagram of a system of a typical use of the invention of FIG. 1.

FIG. 9 is a block diagram of a system of a typical use of the invention of FIG. 1. In this case a three dimensional seismic project is enabled with the smart geophones. Each battery booster unit is coupled to six streamers of phones, with each streamer containing six phones.

The survey can be plotted into lines of geophones. These lines correspond to a typical two-dimensional seismic survey. Each line is coupled to others through an intelligent crossing unit. The intelligent crossing unit fills the basic functions of such a two dimensional survey.

The intelligent crossing units are coupled to a central recording system. This may be accomplished though a high-speed data pathway, such as a fibre channel backbone. In this manner, a remote operator may check each and every geophone from the remote site. In this manner, a great area array may have all its components tested prior to production, and the components can be tested on an individual basis.

As such, a system and method for a digital seismic receiver and a method for gathering data from a seismic survey is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims that follow.

I claim:

1. A seismic receiver for detecting seismic energy and transmitting digital data relating to the detected seismic energy to a data recorder, the receiver comprising:
    a casing;
    a seismic energy detector that detects the seismic energy and converts the detected seismic energy into an analog electrical signal;
    an analog to digital converter, coupled to the seismic energy detector, that converts the analog electrical signal into multiple digital data points, wherein the receiver is configured to store the multiple digital data points; and
    a digital signal transmission circuitry, coupled to the analog to digital converter, that transmits a batch of the stored digital data points to the data recorder;
    wherein the seismic energy detector, the digital transmission circuitry, and the analog to digital converter are housed within the casing.

2. The seismic receiver of claim 1, further comprising:
    a control circuitry, coupled to the analog to digital converter, that controls functions associated with the operation of the seismic receiver.

3. The seismic receiver of claim 2, further comprising an amplifier, coupled to the analog to digital converter, that amplifies the analog signal.

4. The seismic receiver of claim 3, wherein the control circuitry controls the amplifier.

5. The seismic receiver of claim 2, further comprising a power management circuitry, the power management circuitry housed in the casing and providing power to components of the seismic receiver.

6. The receiver of claim 2, wherein the control circuitry provides clock signals to the analog to digital converter.

7. The seismic receiver of claim 2, wherein the control circuitry is operable to receive a signal from an external source, and initiates a transmission of the data in response to the external signal.

8. The seismic receiver of claim 2, wherein the digital transmission circuitry and the analog to digital converter are embodied on a printed circuit board (PCB) in the casing.

9. An apparatus to digitize a seismic signal collected by a seismic signal collector of a seismic receiver, the apparatus comprising:
    a casing;
    a board capable of conducting electrical signals;
    a digitizer, communicatively coupled to the seismic signal collector and contained on the board, that digitizes the seismic signal into multiple digital data points of the digitized seismic signal wherein the receiver is configured to store the multiple digital data points;
    a digital signal transmission circuitry, coupled to the digitizer, that transmits a batch of the stored multiple digital data points to a data recorder;
    the board fitting inside the seismic receiver;
    wherein the seismic signal collector, the digitizer, the digital transmission circuitry, and the board are housed within the casing.

10. The apparatus of claim 9, further comprising:
    control circuitry, communicatively coupled to the digitizer, that controls the digitizing of the seismic signal.

11. The apparatus of claim 9 wherein the board can be folded on itself without breaking the electrical connections contained thereon.

12. A seismic streamer that collects seismic data and transmits digital data representative of collected seismic data to a collection device, the seismic streamer comprising:
    a plurality of seismic receivers communicatively coupled to one another through a transmission line, at least one of the seismic receivers comprising:
        a casing;
        a seismic energy detector that detects seismic energy and converts the detected seismic energy into an analog electrical signal;
        an analog to digital converter, coupled to the seismic energy detector, that converts the analog electrical signal into multiple digital data points, wherein the receiver is configured to store the multiple digital data points; and
        a digital signal transmission circuitry, coupled to the analog to digital converter, that transmits a batch of the stored digital data points to a data recorder;

wherein the seismic energy detector, the digital transmission circuitry, and the analog to digital converter are housed within the casing.

13. A seismic exploration system for collecting digital data representative of collected seismic data, the system comprising:

a data recorder that collects digital data representative of collected seismic data; and a plurality of seismic receivers communicatively coupled to one another through a transmission line, at least one of the seismic receivers comprising:

a casing;

a seismic energy detector that detects seismic energy and converts the detected seismic energy into an analog electrical signal;

an analog to digital converter, coupled to the seismic energy detector, that converts the analog electrical signal into multiple digital data points, wherein the receiver is configured to store the multiple digital data points; and a digital signal transmission circuitry, coupled to the analog to digital converter, that transmits a batch of the stored digital data points to a data recorder;

wherein the seismic energy detector, the digital transmission circuitry, and the analog to digital converter are housed within the casing.

* * * * *